United States Patent [19]

Tsukagoshi

[11] Patent Number: 4,987,483
[45] Date of Patent: Jan. 22, 1991

[54] PROJECTION TELEVISION SET
[75] Inventor: Kazuo Tsukagoshi, Nagaokakyo, Japan
[73] Assignee: Mitsubishi Denki Kabushiki Kaisha, Tokyo, Japan
[21] Appl. No.: 331,506
[22] Filed: Mar. 31, 1989
[30] Foreign Application Priority Data Apr. 4, 1988 [JP] Japan .................. 63-82655

[51] Int. Cl.$^5$ .................. H04N 9/18; H04N 5/74; H04N 5/72
[52] U.S. Cl. .................. 358/64; 358/237; 358/253; 313/474; 313/112; 350/438
[58] Field of Search .................. 358/60, 64, 250, 237, 358/252, 253; 313/474, 112; 350/438, 166, 167

[56] References Cited

U.S. PATENT DOCUMENTS

| 3,723,805 | 3/1973 | Scarpino | 358/250 |
| 4,679,069 | 7/1987 | Andrea et al. | 358/60 |
| 4,753,519 | 6/1988 | Miyatake | 358/250 |
| 4,807,014 | 2/1989 | Van Gorkum et al. | 358/60 |

FOREIGN PATENT DOCUMENTS

| 0134592 | 8/1983 | Japan | 358/60 |
| 61-212813 | 9/1986 | Japan. | |

*Primary Examiner*—James J. Groody
*Assistant Examiner*—Glenton Burgess

[57] ABSTRACT

In a projection television set including red, green and blue CRTs, and red, green and blue projection lens systems, the green projection lens system is provided with a coating or a filter having a high reflecting coefficient against light below about 520 nm and above about 570 nm in wavelength. Therefore, unnecessary light, emitted from a green light source in the green projection lens system, can be reflected by the coating of filter so that only necessary light is passed. This allows for a projection television set which contains a color reproduction range closer to the color reproduction range of a standard television set.

10 Claims, 4 Drawing Sheets

PROJECTION TELEVISION SET

BACKGROUND OF THE INVENTION

The present invention relates to a projection television set including a combination of three cathode ray tubes (CRTs) and projection lens systems for the three primary colors, i.e., red, green and blue.

FIG. 7 shows an example of prior-art projection television set. As illustrated, it comprises a video signal processor SP, three CRTs TR, TG and TB, three projection lens systems LR, LG and LB and a screen SC. The video signal processor produces video signals for red, green and blue components, which are supplied to the three CRTs TR, TG and TB. Images produced on the CRT fluorescent surfaces of the CRTs are passed through and enlarged by the projection lens systems LR, LG and LG, respectively and projected onto a projection television screen SC. A problem associated with the prior art television set is that the fidelity of green color is not satisfactory in certain applications.

FIG. 6 shows an example of the green projection lens system LG and the associated CRT TG. In the figure, reference numeral 1 denotes CRT face glass. Reference numeral 2 denotes a CRT fluorescent surface. Reference numerals 3, 4 and 5 denote a first, second and third projection lens elements. In the projection lens system as illustrated in FIG. 6, light emitted from a green CRT fluorescent surface 2 having a light-emitting spectrum indicated by solid lines 10, 11 and 12 in FIG. 2 passes through the projection lens elements 3, 4 and 5 is and enlarged and projected on the projection television screen SC. The color reproduction of green light as projected on the screen SC is at the chromaticity point 15 in the x, y chromaticity diagram of FIG. 3.

Because the prior-art projection lens system is constructed as described above, the unnecessary light component in the green light-emitting spectrum is also projected. Thus, is not possible to secure the same color reproduction range achieved with a standard television.

SUMMARY OF THE INVENTION

An objection of the invention is to eliminate the above problems.

Another object of the invention is to provide a projection television set which has a color reproduction range closer to the color reproduction range of a standard television.

A projection television set, according to the invention, includes a red CRT having a red light-emitting screen, a green CRT having a green light-emitting screen, a blue CRT having a blue light-emitting screen, a red projection lens system associated with the red CRT to project the light from the red CRT onto a projection screen, a green projection lens system associated with the green CRT to project the light from the green CRT onto the projection screen, and a blue projection lens system associated with the blue CRT to project the light from the blue CRT onto the projection screen. Further, the system includes the green projection lens system is provided with a coating or a filter having a high-reflecting coefficient against light below about 520 nm and above about 570 nm in wave length.

In this invention, the unnecessary light emitted from the green fluorescent substance is reflected at the coating or the filter, and the necessary light alone is passed.

DETAILED DESCRIPTION OF THE EMBODIMENTS

Figure 7:
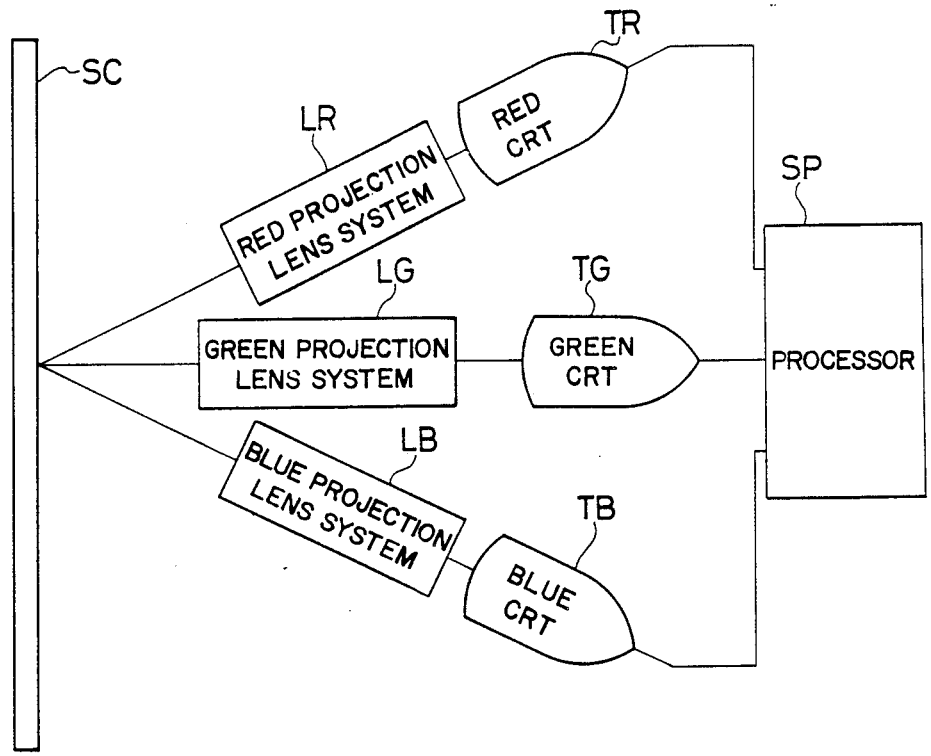
FIG. 7 is a schematic diagram showing a projection television set.

An embodiment of the invention will now be described with reference to the drawings. The overall configuration of the projection television set according to the invention is identical to that shown in FIG. 7. The difference of the invention from the prior art resides in the green projection lens system, which is also denoted by LG.

Figure 1:
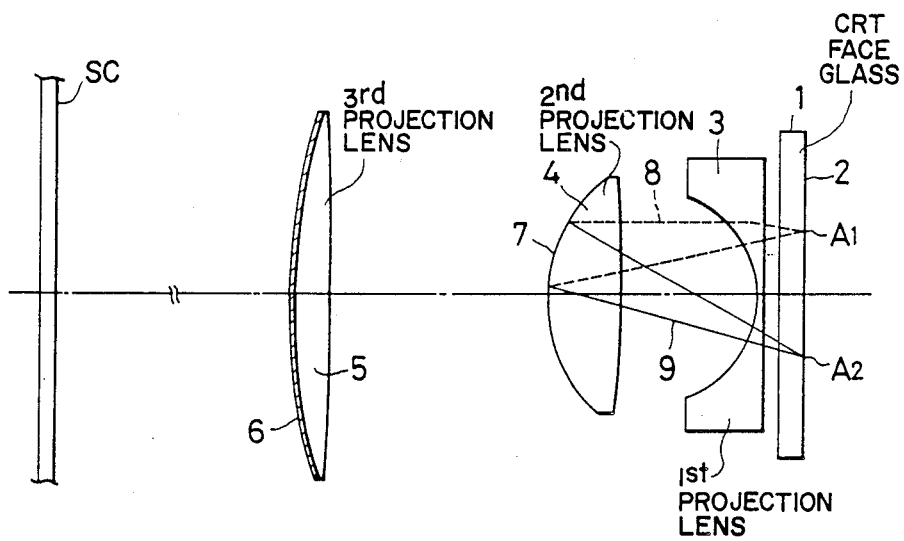
FIG. 1 is a diagram showing projection lens elements in a green projection lens system in an embodiment of the invention.
Figure 6:
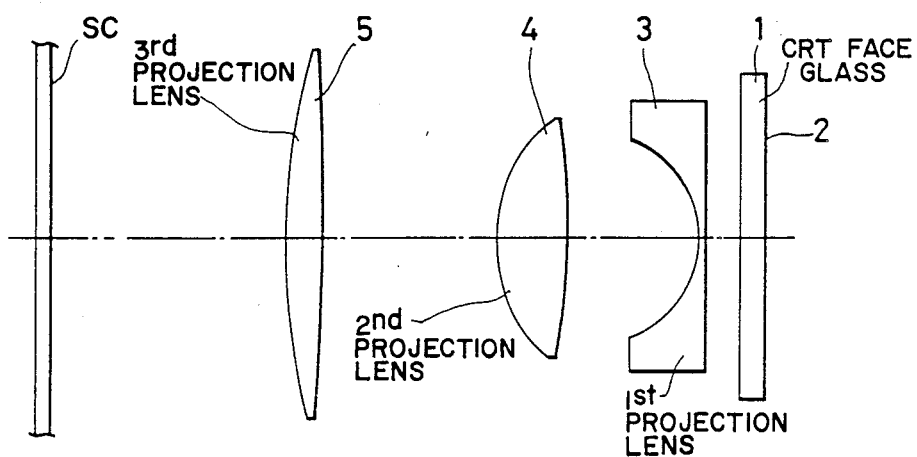
FIG. 6 is a diagram showing an arrangement of projection lens elements in the prior art.

FIG. 1 shows a green projection lens system in a projection television set according to the invention. In the figure, reference numerals 1 to 5 denotes identical components as those shown in FIG. 6. That is, reference numeral 1 denotes a green CRT face glass. Reference numeral 2 denotes a green CRT fluorescent surface. Reference numerals 3, 4 and 5 denote a first, second and third projection lens elements of the green projection lens system LG. Reference numeral 6 denotes a coating formed on the exit surface of the third projection lens 5. This coating has a transmission characteristics as indicated by broken line 13 in the spectrum diagram of FIG. 2. Reference numeral 7 denotes the exit surface of the second projection lens 4. Reference numeral 8 denotes a light emitted from point A1 on the CRT light-emitting surface 2. Reference numeral 9 denotes light reflected from the exit surface 7 of the projection lens 4.

The coating 6 may for example be in the form of a multi-layer film, such as a dichroic mirror coating, formed of high-refraction films and low-refraction films which are stacked alternately by vapor deposition. Each film may contain a thickness of an integer multiple ¼ of the reference wavelength, or a thickness determined on the basis of the above-mentioned thickness, to provide the required color separation. Examples of materials suitable for the high-refraction films are $TiO_2$ and $ZrO_2$. Examples of materials suitable for the low-refraction films are $SiO_2$ and $MgF_2$.

Figure 2:
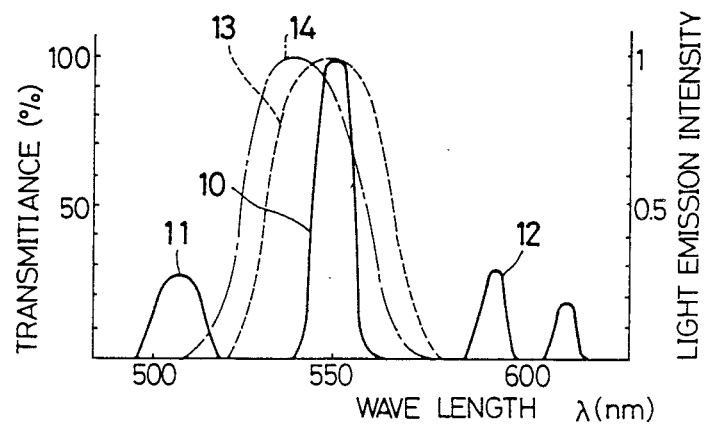
FIG. 2 is a diagram showing the light-emitting spectrum of the green fluorescent substance and the transmittance characteristics of the coating employed in the invention.
Figure 3:
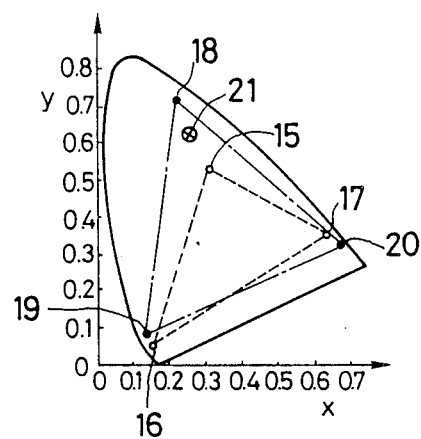
FIG. 3 is an x, y chromaticity diagram.

The function of the green projection lens system shown in FIG. 1 will now be described. The light emitted from the green light-emitting surface 2 having a light spectrum shown by solid lines 10, 11 and 12 in FIG. 2 is passed through the first, second and third projection lenses 3, 4 and 5. The coating 6, having a transmittance characteeristics shown by broken line 13 in FIG. 2, permits passage of only the most intense spectrum 10. The light spectra 11 and 12 are reflected by the coating 6 and are not output from the projection lens system as a projection light. Accordingly, the unnecessary light spectra are not projected on the projection screen. Thus, a green chromaticity point 21 as indicated in FIG. 3, which is close to that of the green chromaticity point 18 of the standard television, can be obtained.

When the coating 6 is formed on the surface 7 of the second projection lens 4 positioned closer to the light-emitting surface 2, and unnecessary reflected light can be focused on the point A2 on the light-emitting surface 2. This causes a degradation of contrast. Therefore, the coating should be disposed so as not to cause image-formation on the light-emitting surface 2.

Figure 4:
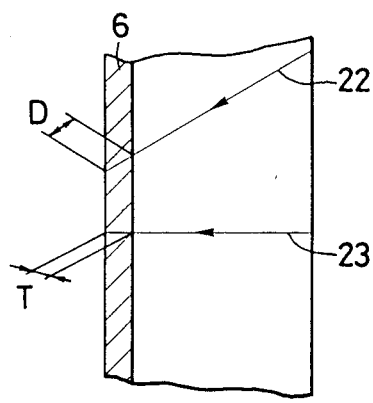
FIG. 4 is a diagram showing angle dependence of light incident on the coating.

The coating 6 should be formed on a surface where the angle-dependency of light is small. If the coating 6 is formed on a surface the angle-dependency of light is considerable, light 22 entering at a large angle of incidence, as shown in FIG. 4, must travel an oblique dimension D of the coating 6, which is larger than the thickness T of the coating which the light 23 entering at a right angle needs only to travel. The transmittance characteristics of the coating 6 against the light 22 is as shown by broken line 14 in FIG. 2, and part of the necessary light is also reflected. This is why the coating 6 should be formed on a surface where the angle-dependencey of light is small.

In the preferred embodiment, a coating is formed on the exit surface of the third projection lens 5. However, the coating can also be formed on any other lens. The coating can be formed on the entrance surface of any lens.

Figure 5:
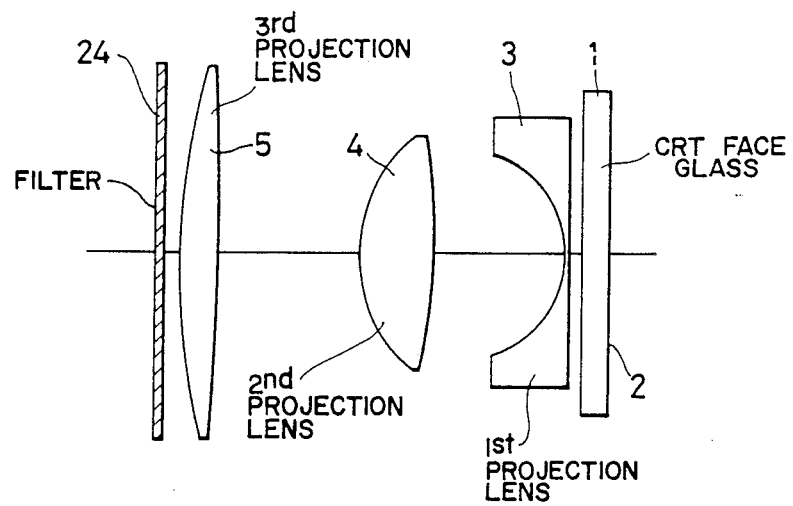
FIG. 5 is a diagram showing projection lens elements in another embodiment of the invention.

In another preferred embodiment, shown in FIG. 5, a filter 24 is alternatively disposed adjacent the third projection lens 5. The filter can also be formed at other locations.

As has been described, according to the invention, a coating or a filter having a high-reflection coefficient against light, below about 520 nm and above about 570 nm in wavelength, is provided in the green projection lens system.

Accordingly, with a green fluorescent substance emitting unnecessary light spectra, the enlargement and projection can be accomplished without degrading the necessary light spectrum. Therefore, the resultant color reproduction range is close to the color reproduction range of the standard television.

What is claimed is:

1. A projection television apparatus comprising:
   red, green and blue CRT; and
   red, green and blue projection lens systems respectively associated with the red, green and blue CRT, each projection lens system receiving light from the associated CRT and projecting ii onto a common projection screen; said projection lens system associated with said green CRT including,
   a lens, having a surface on which a coating is formed, said coating being disposed on an output side of the lens, from which light exits the lens and is subsequently projected onto said common projection screen, and reflecting light below approximately 520 nm and above approximately 570 nm in wavelength, said surface on which said coating is formed having a small angle of incidence so that light between 520 nm and 570 nm in wavelength transmitted through said lens and said coating travels a distance through said coating which is substantially equal to the thickness of said coating so as to assure the proper transmission of light between approximately 520 nm and 570 nm in wavelength.

2. A projection television apparatus as claimed in claim 1, wherein said coating is formed on said surface to avoid causing image-formation on a light emitting surface of the green CRT due to reflection at said coating and to avoid causing degradation in contrast.

3. A projection television apparatus, as claimed in claim 1, wherein said coating is a dichroic coating.

4. A projection television apparatus, as claimed in claim 1, wherein said projection lens system associated with said green CRT further includes,
   a second lens containing a flat surface and a convex surface, and
   a third lens containing a flat surface and a concave surface.

5. A projection television apparatus, as claimed in claim 1, wherein said coating is formed of a multi-layer film acting as an interference filter.

6. A projection television apparatus, as claimed in claim 1, wherein said surface of said lens on which a coating is formed is a convex surface.

7. A projection television apparatus, as claimed in claim 5, wherein said multi-layer film comprises:
   high refraction films and low refraction films stacked alternately by vapor depositions.

8. A projection television apparatus, as claimed in claim 7, wherein said refraction films comprise at least one of $TiO_2$ and $ZrO_2$.

9. A projection television apparatus, as claimed in claim 7, wherein said low refraction films comprise at least one of $SiO_2$ and $MgF_2$.

10. A method of achieving a color reproduction range in a projection television including red, green and blue CRTs and red, green and blue projection lens systems, which is similar to a color reproduction range of a standard television, said method comprising the steps of:
    forming a coating on an exit surface of a lens of said green production lens system; and
    projecting light from each of said red, green, and blue CRTs, through said corresponding projection lens system onto a common projection screen to achieve said color reproduction, said light projected from said green CRT entering said lens and exiting said coating of said green projection lens system, being subsequently projected onto said common projection screen and being between 520 nm and 570 nm in wavelength, having traveled a distance through said lens and said coating which is substantially equal to the thickness of said coating so as to assure the proper transmittance of light between approximately 520 nm and 570 nm in wavelength.

* * * * *